(12) United States Patent
Kubota et al.

(10) Patent No.: US 6,300,927 B1
(45) Date of Patent: Oct. 9, 2001

(54) DISPLAY DEVICE

(75) Inventors: Yasushi Kubota, Nara; Kenichi Katoh, Hiroshima; Jun Koyama, Kanagawa, all of (JP)

(73) Assignees: Semiconductor Energy Laboratory Co., Ltd., Kanagawa-ken; Sharp Kabushiki Kaisha, Osaka, both of (JP)

( * ) Notice: Subject to any disclaimer, the term of this patent is extended or adjusted under 35 U.S.C. 154(b) by 0 days.

(21) Appl. No.: 08/932,246

(22) Filed: Sep. 17, 1997

(30) Foreign Application Priority Data

Sep. 20, 1996 (JP) .................................................. 8-271614

(51) Int. Cl.[7] ........................................................ G09G 3/36
(52) U.S. Cl. ........................... 345/92; 345/98; 345/100; 345/206
(58) Field of Search .............................. 345/92, 98, 100, 345/80, 206; 257/57, 59; 438/157

(56) References Cited

U.S. PATENT DOCUMENTS

| | | | |
|---|---|---|---|
| 4,694,347 | * 9/1987 | Ito | 348/794 |
| 5,459,483 | * 10/1995 | Edwards | 345/98 |
| 5,680,149 | * 10/1997 | Koyama | 345/98 |
| 5,693,549 | * 12/1997 | Kim | 438/157 |
| 5,734,366 | * 3/1998 | Kubota et al. | 345/100 |
| 5,818,068 | * 10/1998 | Sasaki | 257/59 |
| 5,841,317 | * 11/1998 | Ohmori et al. | 327/563 |
| 5,854,494 | * 12/1998 | Yamasaki et al. | 257/57 |

* cited by examiner

*Primary Examiner*—Steven Saras
*Assistant Examiner*—Fritz Alphonse
(74) *Attorney, Agent, or Firm*—Fish & Richardson P.C.

(57) ABSTRACT

There is disclosed an active matrix liquid crystal display that receives input signals having small amplitudes and needs no externally attached level-shifting circuit. The active matrix liquid crystal display has a level-shifting circuit for amplifying various input signals, such as control signals, a clock signal, and a start pulse signal, and supplying the amplified signals to peripheral driver circuits. These peripheral driver circuits drive an active matrix circuit. The level-shifting circuit is made of a differential amplifier consisting of polysilicon TFTs. This amplifier is an analog amplifier. This level-shifting circuit is fabricated on the same substrate as the active matrix circuit and the peripheral driver circuits. If the amplitudes of the input signals are small, level-shifting operations can be performed well. Since any externally attached level-shifting circuit is dispensed with, the cost can be curtailed.

22 Claims, 7 Drawing Sheets

FIG. 10B ns at tempera-/V sec. On the other hand, the mobilities of
DISPLAY DEVICE

BACKGROUND OF THE INVENTION

1. Field of the Invention

The present invention relates to a display device such as an active matrix liquid crystal display device and, more particularly, to a monolithic active matrix liquid crystal display device comprising a substrate that has driver circuits as well as an active matrix circuit.

2. Description of the Related Art

Figure 2:
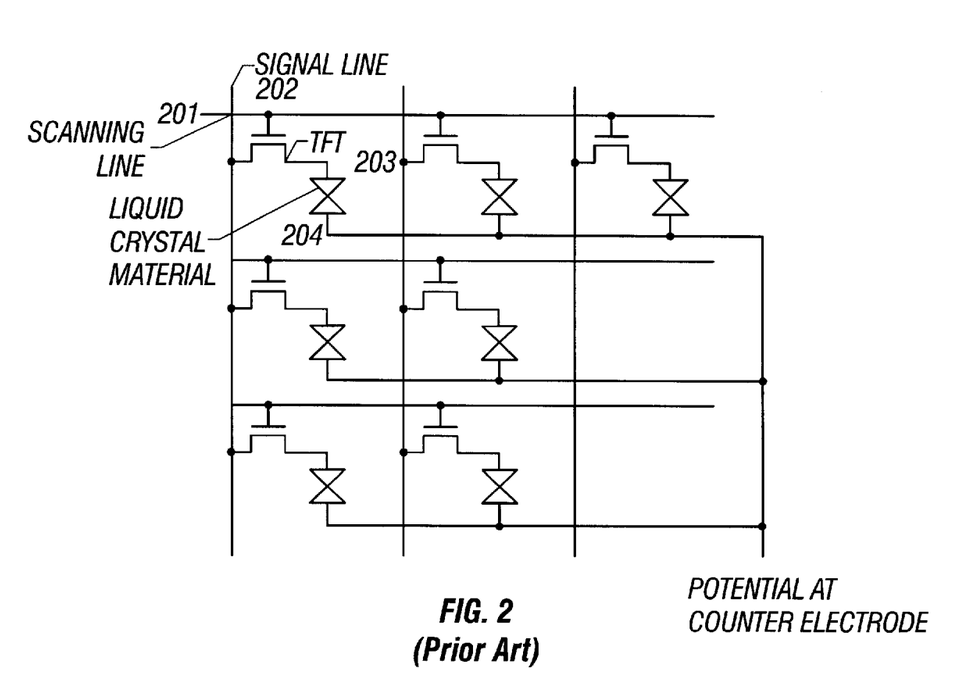
FIG. 2 is a fragmentary circuit diagram of an active matrix circuit using TFTs.

An active matrix display is shown in FIG. 2 and has scanning lines 201 and signal lines 202 meeting at intersections. A liquid crystal material 204 is disposed as a pixel at each intersection. Every pixel is equipped with a switching device 203. Information about the pixels is represented by turning on and off the switching devices. For example, a liquid crystal material is used as a display medium in such a display device. In the present invention, thin-film transistors (TFTs) each having three terminals, i.e., gate, source, and drain, are used as switching devices.

In the present specification, a row of a matrix construction means scanning lines (gate lines) which extend parallel to the row and are connected with the gate electrodes of the TFTs in the row. A column of the matrix construction means signal lines (source lines) which run parallel to the column and are connected with the source (or drain) electrodes of the TFTs in the column. A circuit for driving the scanning lines is referred to as a scanning line driver circuit. A circuit for driving the signal lines is referred to as a signal line driver circuit. A thin-film transistor is referred to as a TFT.

Figure 3A:
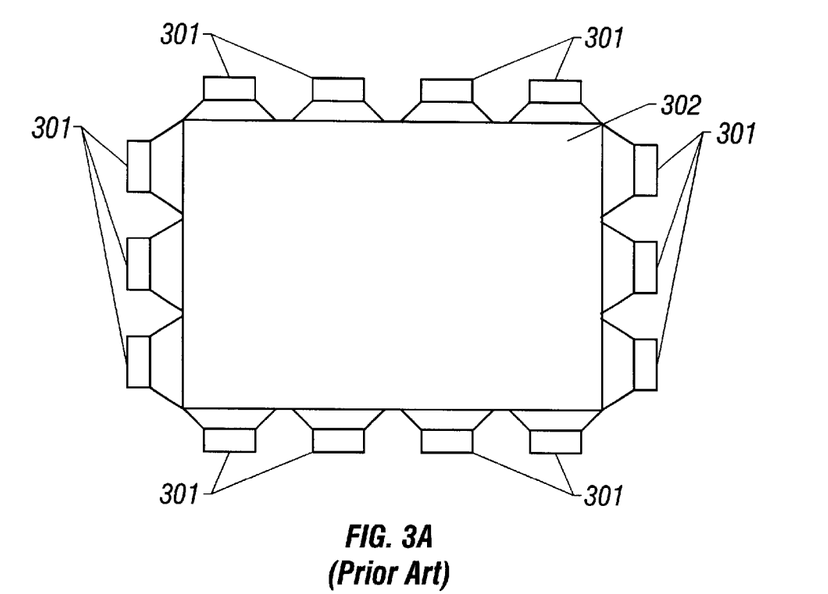
FIGS. 3(a) and 3(b) are top plan views of conventional active matrix displays using amorphous silicon TFTs.
Figure 3B:
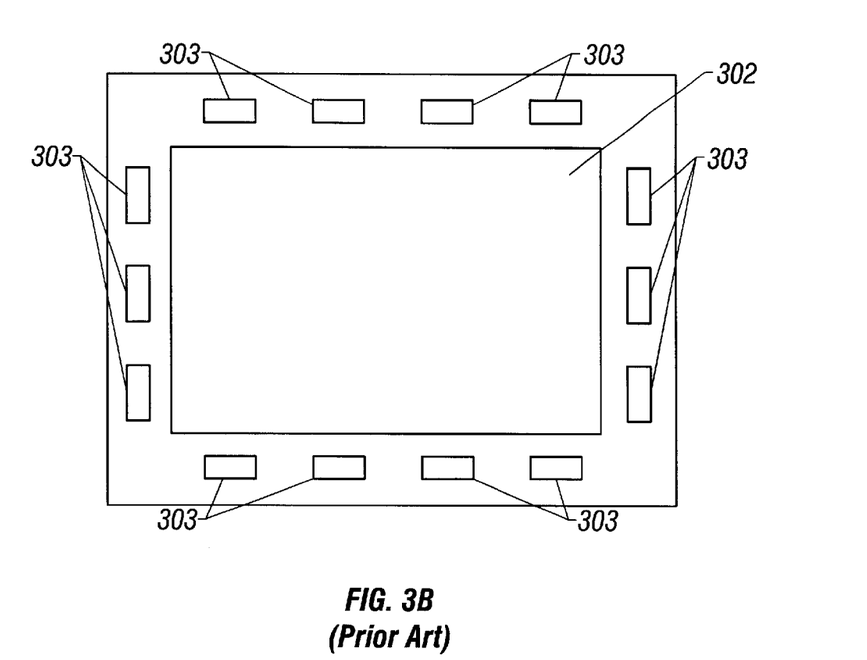

FIGS. 3(a) and 3(b) show one conventional active matrix liquid crystal display. This liquid crystal display uses TFTs made of amorphous silicon to build an active matrix circuit. A scanning line driver circuit and a signal line driver circuit are each made of an integrated circuit using a single-crystal silicon substrate. Typically, a single-crystal silicon driver circuit IC 301 is mounted to the outer periphery of an active matrix circuit 302 made up of amorphous silicon TFTs by TAB techniques (FIG. 3(a)). Alternatively, a single-crystal silicon driver circuit IC chip 303 is mounted by COG (chip-on-glass) techniques (FIG. 3(b)).

This conventional liquid crystal display suffers from the following problems. First, the reliability poses problems, because the scanning and signal line driver circuits are connected with the scanning lines and the signal lines, respectively, of the active matrix circuit by TAB or wire bonding.

For example, where the display device is built in accordance with the video graphics array (VGA) standards, there exist 1920 signal lines and 480 scanning lines. As the resolution is enhanced every year, their numbers tend to be increased. Where a viewfinder for use in a video camera or a projector using a liquid crystal display is manufactured, it is necessary to make the whole display device compact. A liquid crystal display manufactured using TAB is unsuited for such applications because this display needs a large space.

Figure 4:
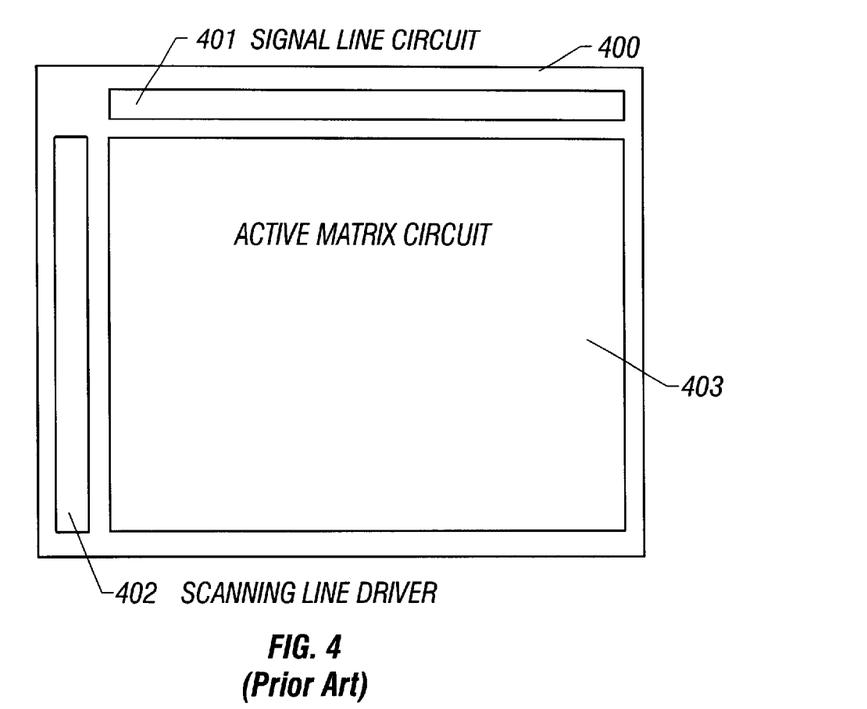
FIG. 4 is a top plan view of the prior art active matrix liquid crystal display using polysilicon TFTs.

TFTs built, using polysilicon, have been developed to fabricate an active matrix liquid crystal display free of the foregoing problem. One example is shown in FIG. 4, where an insulating substrate 400 is made of glass or the like. On this substrate 400, a signal line driver circuit 401 and a scanning line driver circuit 402 are constructed from polysilicon TFTs simultaneously with TFTs forming an active matrix circuit 403. Polysilicon TFTs can be fabricated by high-temperature polysilicon processes. That is, high-temperature polysilicon TFTs are formed on a quartz substrate at a temperature higher than 1000° C. Also, low-temperature polysilicon TFTs can be manufactured on a glass substrate by low-temperature processes at temperatures below 650° C.

The mobilities of amorphous silicon TFTs are approximately 0.5 cm$^2$/V sec. On the other hand, the mobilities of polysilicon TFTs can be set 30 cm$^2$/V or higher sec and thus they can be operated with signals having frequencies only on the order of MHz.

Both digital and analog driver circuits are available to drive active matrix liquid crystal displays. Since a circuit of digital construction has much more devices than a circuit of analog construction, it is customary to use an analog driver circuit where polysilicon TFTs are employed. In one type of scanning line driver circuit and signal line driver circuit, shift registers are utilized. In another type, decoders are used. Driver circuits using low-temperature polysilicon TFTs as described above have the following disadvantages.

The low-temperature polysilicon TFTs process have smaller mobilities and larger threshold values than single-crystal silicon transistors. Therefore, assuming that the TFTs are driven at more than 1 MHz to sample the input video signal, it is necessary to set the power-supply voltage to about 15–18 V, for example.

However, a circuit for controlling a driver circuit of a liquid crystal display is normally made of an integrated circuit using single-crystal silicon. The operating voltage is approximately 5 V. Therefore, the output signal is also approximately 5 V. Under this condition, it is difficult to control the driver circuit consisting of low-temperature polysilicon TFTs.

Figure 5:
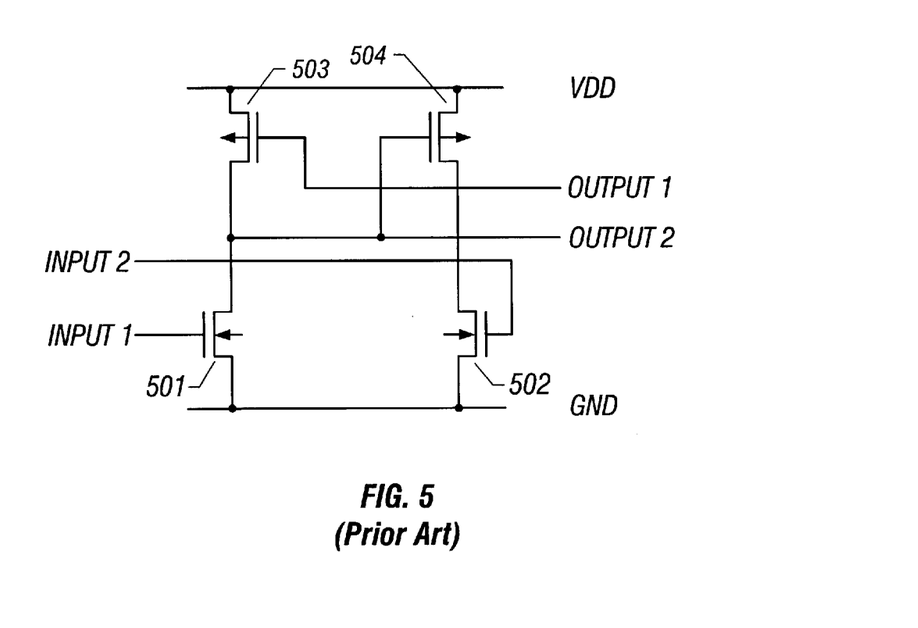
FIG. 5 is a circuit diagram of the prior art level-shifting circuit.

In recent years, ICs made of single-crystal silicon tend to be driven by decreasing power-supply voltages. If the power-supply voltage for a control circuit is 5 V, a level-shifting circuit operating digitally and consisting of N-channel TFTs 501, 502 and P-channel TFTs 503, 504 can be constructed, as shown in FIG. 5, by suppressing the threshold value to about 2 V. This level-shifting circuit is employed in an ordinary CMOS circuit at low frequencies. However, where the power-supply voltage for the IC is 3 V, it is difficult to operate the above-described level-shifting circuit even at decreased frequencies unless the threshold value is set less than 1 V.

Figure 6:
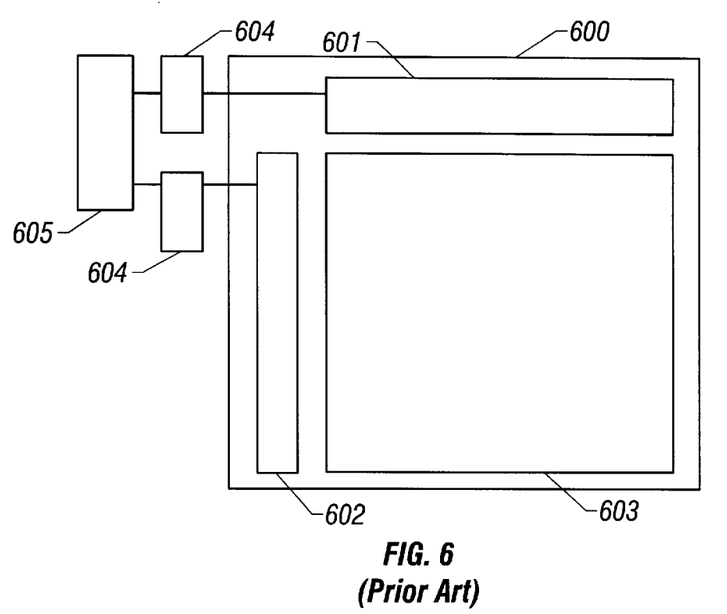
FIG. 6 is a block diagram of the prior art liquid crystal display.

Accordingly, it is common practice to insert a level-shifting circuit 604 made of a proprietary single-crystal IC or externally attached transistors between a control circuit 605 made of single-crystal silicon and each of a signal line driver circuit 601 and a scanning line driver circuit 602, as shown in FIG. 6, to drive an active matrix circuit 603 fabricated on an insulating substrate 600 made of glass or the like. The signal line driver circuit 601 and the scanning line driver circuit 602 are fabricated from low-temperature polysilicon TFTs on the substrate 600. Where these level-shifting circuits are attached externally, if more signals are treated, the number of externally attached level-shifting circuits are increased accordingly. This leads to an increase in the cost.

SUMMARY OF THE INVENTION

The foregoing problems are solved by an active matrix liquid crystal display comprising an insulating substrate, an active matrix circuit using TFTs as switching devices, a signal line driver circuit and a scanning line driver circuit for driving the active matrix circuit, and at least one differential amplifier. All of the active matrix circuit, the signal line driver circuit, the scanning line driver circuit, and the differential amplifier are fabricated on the insulating substrate. The differential amplifier is made up of TFTs and amplifies non-inverted and inverted input signals entered from a pair of input terminals. The amplified signals are sent to the signal line driver circuit or to the scanning line driver circuit.

In one feature of the invention, the amplitudes of the input signals described above are less than 5 V.

In another feature of the invention, the differential amplifier described above comprises a differential circuit made up of plural TFTs whose sources are connected together. A constant-current source is connected with the differential circuit.

In a further feature of the invention, the differential amplifier described above is an analog amplifier made up of plural TFTs whose sources are connected together. A constant-current source is connected with the differential amplifier. The output from the differential amplifier is amplified by a source-grounded amplifier circuit.

In a still other feature of the invention, the differential amplifier described above is made up of low-temperature polysilicon TFTs fabricated by a low-temperature process having a maximum process temperature lower than 650° C.

In the structure described above, the input signals mean control signals, clock signals, etc. for controlling the scanning line driver circuit and the signal line driver circuit. Each of the scanning and signal line driver circuits mainly consists of shift registers or decoders.

An active matrix circuit in accordance with the present invention is driven by peripheral driver circuits comprising level-shifting circuits for amplifying input signals such as control signals, a clock signal, and a start pulse signal. Each level-shifting circuit is fabricated from a differential amplifier consisting of TFTs of polysilicon, or polycrystalline silicon. These level-shifting circuits are operated in the analog mode rather than in the conventional digital mode. These level-shifting circuits are fabricated on the same substrate as the active matrix circuit and the peripheral driver circuits. As a result, where the signals input to the liquid crystal display have small amplitudes (i.e., the power-supply voltage for the control circuit is 5 V or less), level-shifting operations can be performed well. Also, any externally attached level-shifting circuit is dispensed with. In consequence, the cost can be curtailed.

Other objects and features of the invention will appear in the course of the description thereof, which follows.

DETAILED DESCRIPTION OF THE PREFERRED EMBODIMENTS

EXAMPLE 1

Figure 1:
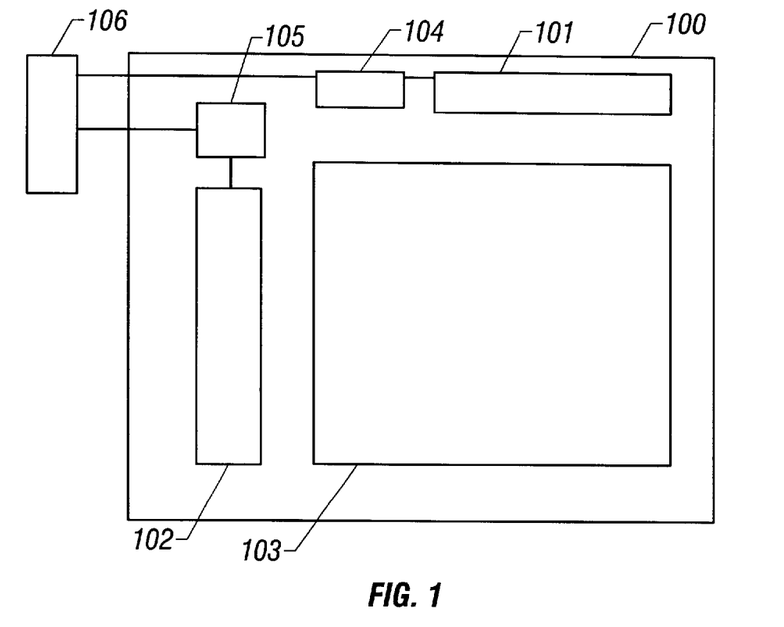
FIG. 1 is a block diagram of a liquid crystal display in accordance with the present invention.

Referring to FIG. 1, there is shown an active matrix liquid crystal display having driver circuits and embodying the concept of the present invention. This liquid crystal display comprises an insulating substrate 100 on which an active matrix circuit 103, a signal line driver circuit 101, a scanning line driver circuit 102, a signal line differential amplifier 104, and a scanning line differential amplifier 105 are fabricated. The signal line driver circuit 101 and the scanning line driver circuit 102 drive the active matrix circuit 103. The signal line differential amplifier 104 and the scanning line differential amplifier 105 are located between the driver circuits 101 and 102.

An external control circuit 106 is made of a single-crystal IC and produces signals for driving the signal line driver circuit 101 and the scanning line driver circuit 102. These signals are supplied to a display device. Normally, the amplitudes of the signals are lower than the power-supply voltage inside the liquid crystal display, usually approximately between 3 V and 5.5 V.

An example of the differential amplifiers described above is shown in FIG. 7. The illustrated differential amplifier consists of TFTs whose sources are connected together to form a differential circuit that is operated with a constant current. Therefore, at least one of the TFTs of the differential circuit is ON at all times and operates in an analog manner. Consequently, the circuit can cope with smaller input signals than heretofore, e.g., the amplitudes of the input signals are less than about 3 V. This differential amplifier operates in the manner described below.

Figure 7:
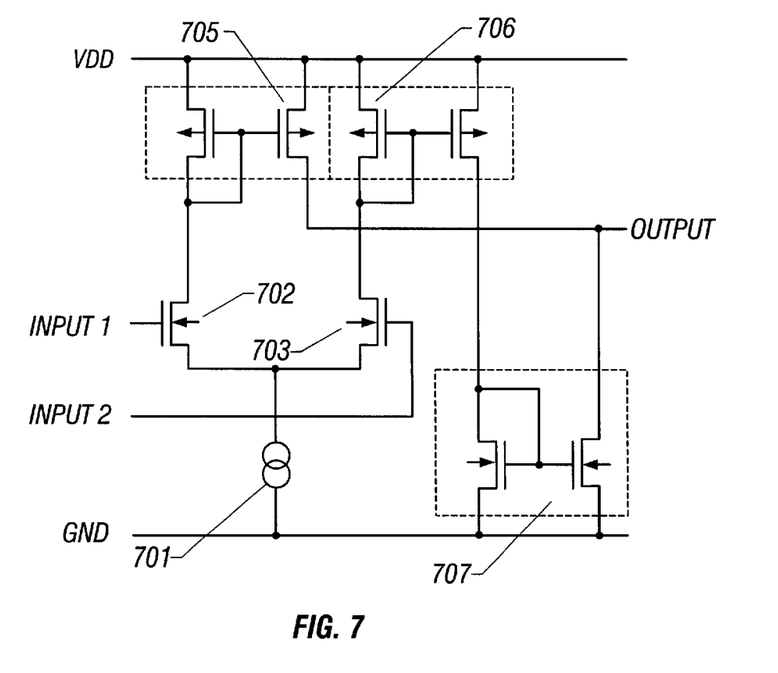
FIG. 7 is a circuit diagram of a differential amplifier used in a liquid crystal display in accordance with the invention.

In FIG. 7, the differential circuit is made of N-channel TFTs 702 and 703 and has a pair of input terminals, or inputs 1 and 2, to which non-inverted and inverted input signals such as driving signals, a clock signal, and a start pulse, are applied. In particular, when a non-inverted signal is applied to the gate (input 1) of the TFT 702 and an inverted signal is applied to the gate (input 2) of the TFT 703, the voltage across the gate and source of the TFT 702 increases but the voltage across the gate and source of the TFT 703 decreases.

The sources of the TFTs 702 and 703 are connected together and operated with a constant-current source 701. The current flowing through the TFT 703 decreases by an amount equal to the increase in the current flowing through the TFT 702.

The drains of the TFTs 702 and 703 are connected with current mirror circuits 705 and 706, respectively. The currents flowing through these drains are inverted at the same magnitude. The output from the current mirror circuit 706 is coupled to a current mirror circuit 707 and inverted similarly.

The outputs of the current mirror circuits 705 and 707 are connected together and tied to the input of the signal line driver circuit or the scanning line driver circuit directly or via a buffer. If the current flowing through the TFT 702 increases, the current flowing through the current mirror circuit 705 increases but the current flowing through the current mirror circuit 706 decreases. Therefore, the current flowing through the current mirror circuit 707 decreases.

A capacitance is attached to the input terminal of the driver circuit or the input terminal of the buffer connected with the outputs of the current mirror circuits 705 and 707. This capacitance is charged according to the difference between the currents flowing through the current mirror circuits 705 and 706, respectively. As a result, the potential at the capacitance reaches the potential at the positive terminal (+) of the power supply. If the signals applied to the TFTs 702 and 703 have an opposite relation to the above-described case, a reverse operation takes place. The potential at the input terminal of the driver circuit or the input terminal of the buffer circuit decreases down to the potential at the negative terminal (−) of the power supply. In this way, a large input signal to be supplied into the driver circuit can be formed from an input signal having a small amplitude. In the present embodiment, each differential circuit is built from N-channel TFTs. The differential circuits may also be constructed, using P-channel TFTs.

EXAMPLE 2

Figure 8:
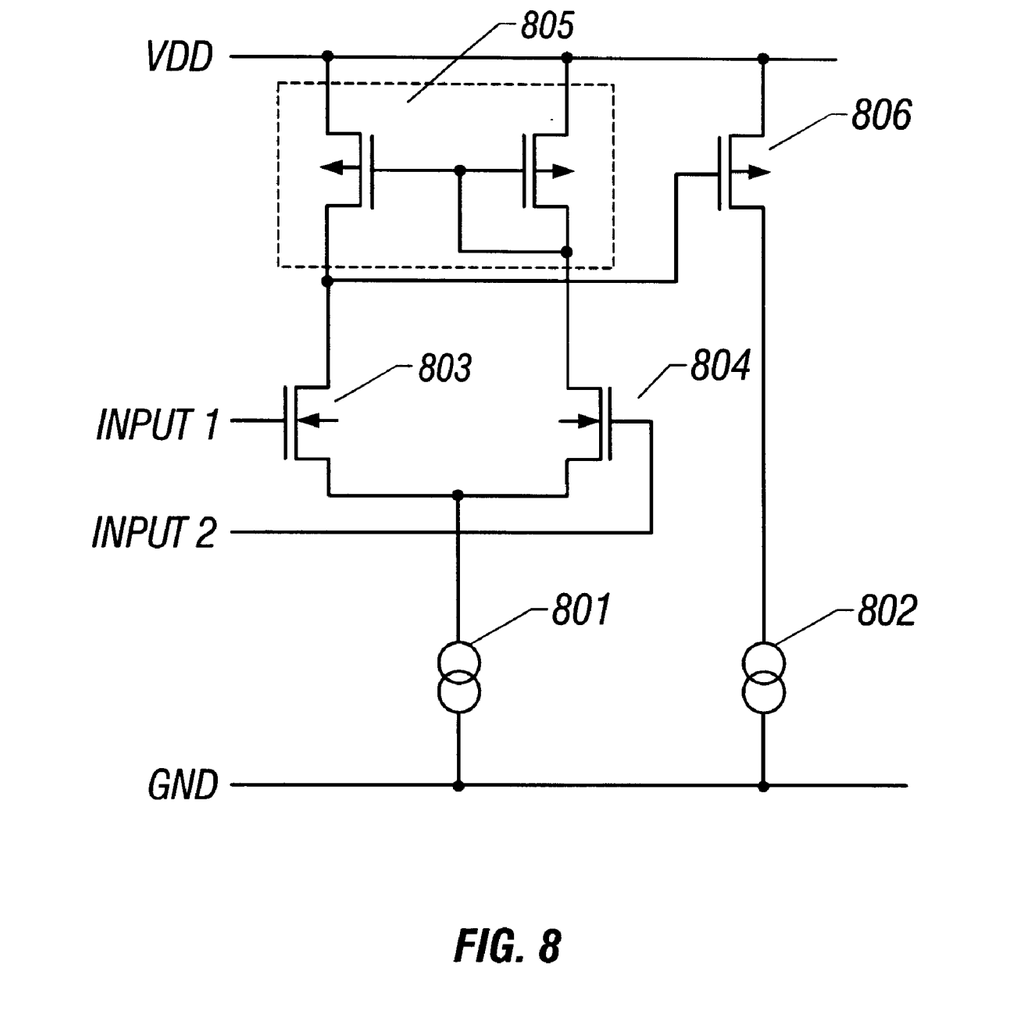
FIG. 8 is a circuit diagram of another differential amplifier used in a liquid crystal display in accordance with the invention.

Referring next to FIG. 8, there is shown another example of differential amplifier. A differential circuit is constructed from a constant-current source 801, TFTs 803, 804, and a current mirror circuit 805. This differential circuit is combined with a source-grounded amplifier circuit consisting of a constant-current source 802 and a P-channel TFT 806. This differential amplifier is inferior to a differential circuit alone in frequency characteristics. However, a greater amplification factor is obtained. Hence, this amplifier is beneficial where input signals have small amplitudes.

EXAMPLE 3

A method of fabricating a liquid crystal display using a monolithic active matrix circuit in accordance with the invention is next described by referring to FIGS. 9(A)–9(D) and 10(A)–10(B). The method is a low-temperature polysilicon fabrication process. The process sequence for fabricating TFTs forming differential amplifiers and peripheral driver circuits is shown to the left of FIGS. 9(A)–9(D). The process sequence for fabricating TFTs forming the active matrix circuit is shown to the right.

Figure 9A:
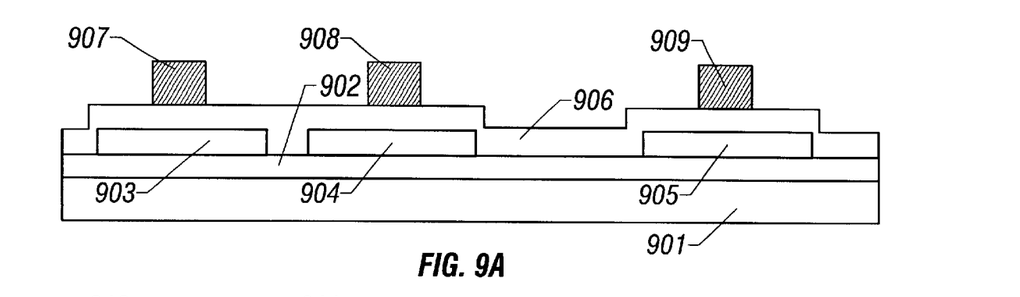
FIGS. 9(A)–9(D) are cross-sectional views illustrating low-temperature polysilicon process steps for fabricating a liquid crystal display in accordance with the invention.
Figure 9B:
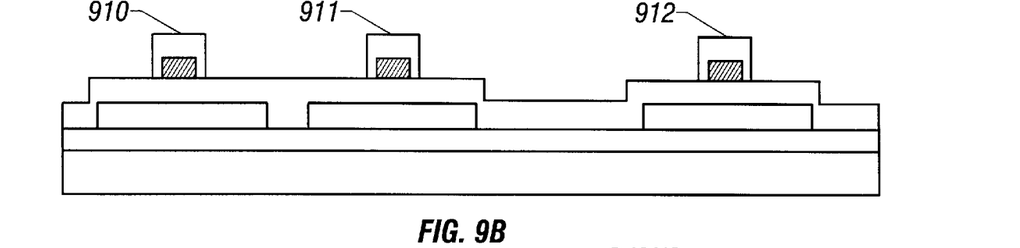
Figure 9C:
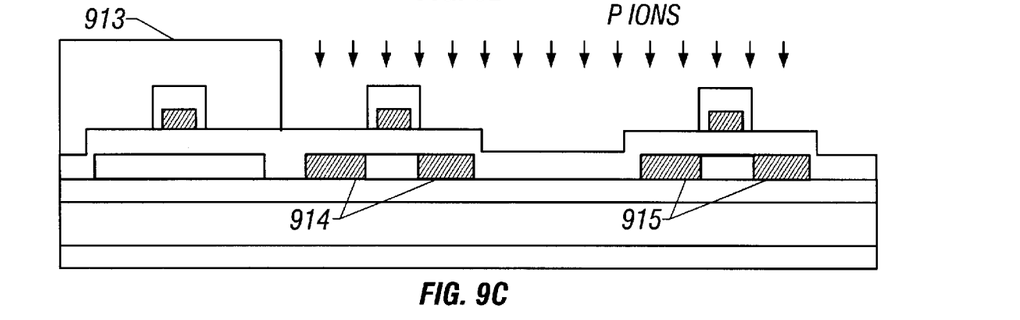

First, a silicon oxide film is formed as a buffer layer 902 on a glass substrate 901 to a thickness of 1000 to 3000 Å. This silicon oxide film may be formed in an oxygen ambient by sputtering or plasma CVD.

Then, an amorphous silicon film is formed to a thickness of 300 to 1500 Å, preferably 500 to 1000 Å, by plasma CVD or LPCVD. The amorphous film is thermally annealed at a temperature 500° C. or higher, preferably 500–600° C., to crystallize the amorphous silicon film or to enhance the crystallinity. After the crystallization making use of thermal annealing, the crystallinity may be further enhanced by carrying out photo-annealing making use of laser light. Furthermore, during the crystallization making use of thermal annealing, an element (or, a catalytic element) such as nickel for promoting crystallization of silicon may be added, as described in Unexamined Published Japanese Patent Applications Nos. 6-244103 and 6-244104.

Then, the silicon film is etched to form islands of an active layer 903 for P-channel TFTs forming a driver circuit, islands of an active layer 904 for N-channel TFTs, and islands of an active layer 905 for pixel TFTs forming a matrix circuit. Furthermore, a gate insulator film 906 of silicon oxide is formed to a thickness of 500 to 2000 Å by sputtering in an oxygen ambient. The gate insulator film may be formed by plasma CVD. Where the silicon oxide film is formed by plasma CVD, it is desired to use nitrogen monoxide ($N_2O$) as a gaseous raw material. Alternatively, oxygen ($O_2$) and monosilane ($SiH_4$) may be employed. After the formation of the gate insulator film, thermal annealing may be carried out 650° C. or less.

Subsequently, an aluminum layer having a thickness of 2000 to 6000 Å is formed by sputtering over the whole surface of the laminate. The aluminum may contain silicon, scandium, palladium, or other material to prevent generation of hillocks in later thermal processing steps. This aluminum layer is etched to form gate electrodes 907, 908, and 909 (FIG. 9(A)).

Thereafter, the aluminum layer is anodized to form aluminum oxide, 910, 911, and 912, on the surface of the aluminum layer. These aluminum regions act as an insulator (FIG. 9(B)).

Then, a photoresist mask 913 which covers the active layer 903 of the P-channel TFTs is formed. Phosphorus ions are introduced by ion doping while using phosphine as a dopant gas. The dose is $1\times10^{12}$ to $5\times10^{13}$ atoms/cm$^2$. As a result, heavily doped N-type regions, or source 914 and drain 915, are formed (FIG. 9(C)).

Thereafter, a photoresist mask 916 for covering both active layer 904 for the N-channel TFTs and active layer 905 for the pixel TFTs is formed. Boron ions are introduced again by ion doping, using diborane ($B_2H_6$) as a dopant gas. The dose is $5\times10^{14}$ to $8\times10^{16}$ atoms/cm$^2$. As a result, P-type regions 917 are formed. Because of the doping steps described thus far, heavily doped N-type regions (source 914 and drain 915) and heavily doped P-type regions (source and drain 917) are formed (FIG. 9(D)).

Figure 9D:
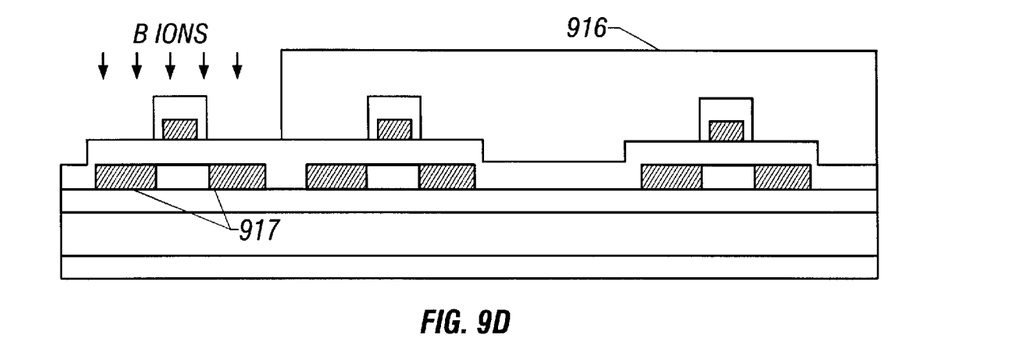
Figure 10A:
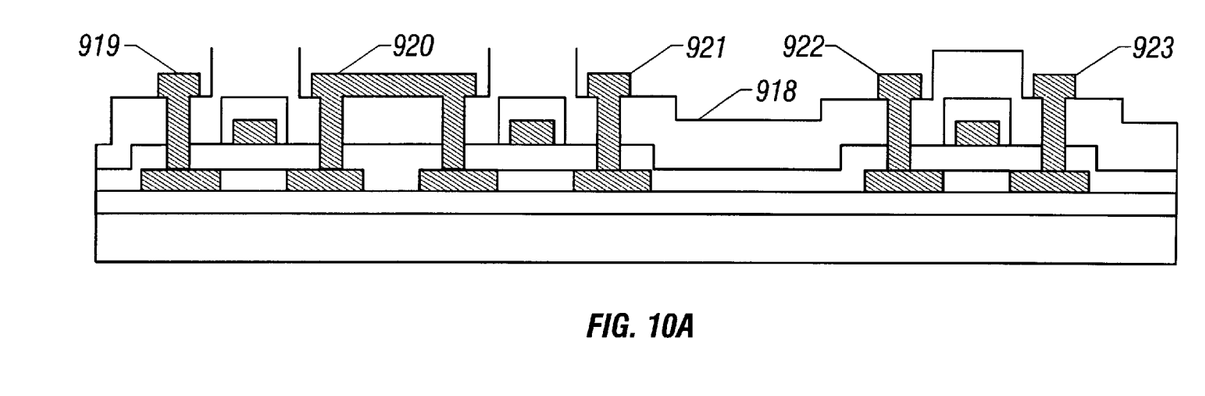
FIGS. 10(A) and 10(B) are cross-sectional views illustrating other low-temperature polysilicon process steps for fabricating a liquid crystal display in accordance with the invention.
Figure 10B:
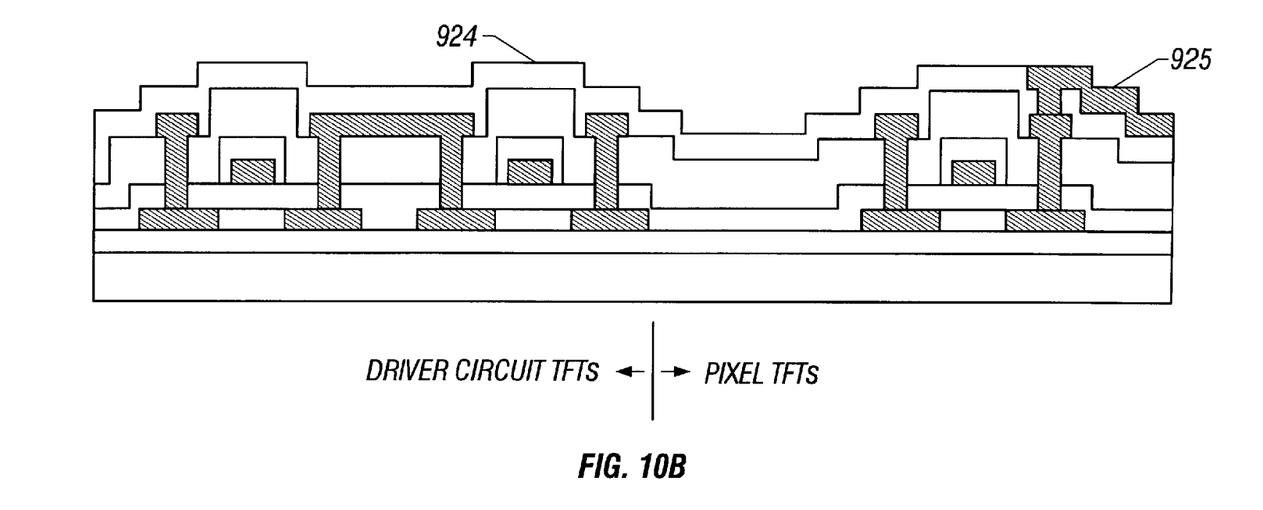

Then, the laminate is thermally annealed at 450–850° C. for 0.5 to 3 hours to repair the damage created by the doping. In this way, the dopants are activated. At the same time, the crystallinity of the silicon is recovered. Thereafter, a silicon oxide film having a thickness of 3000 to 6000 Å is formed as an interlayer dielectric 918 over the whole surface by plasma CVD. This may be a silicon nitride film or a multilayer film of silicon oxide layers and silicon nitride layers. The interlayer dielectric 918 is etched by a wet etching process or a dry etching process to form contact holes in the source/drain regions.

Then, an aluminum film or a multilayer film of titanium and aluminum is formed to a thickness of 2000 to 6000 Å by sputtering techniques. This film is etched so as to create electrodes/interconnects, 919, 920, and 921, for peripheral circuits and pixels/interconnects, 922 and 923, for pixel TFTs (FIG. 10(A)).

Subsequently, a silicon nitride film 924 is formed as a passivation film having a thickness of 1000 to 3000 Å by plasma CVD. This silicon nitride film is etched to create contact holes extending to the electrodes 923 of the pixel TFTs. An ITO (indium-tin oxide) film having a thickness of 500 to 1500 Å is formed by sputtering. Finally, the ITO film is etched to form pixel electrodes 925. In this manner, under the thermal annealing at 650° C. or less, the differential amplifier circuits, the peripheral driver circuits, and the active matrix circuit are formed simultaneously on the same substrate (FIG. 10(B)).

As described thus far, in a liquid crystal display device in accordance with the present invention, an analog differential amplifier made of polysilicon TFTs is formed on a same substrate, together with an active matrix circuit and peripheral driver circuits for driving the active matrix circuit. Where the amplitudes of input signals are 5 V or less, level-shifting operations can be performed well. This can dispense with any externally attached level-shifting circuit. Consequently, the number of the components and the cost can be reduced.

While the present invention has been described with reference to the preferred embodiments, the scope of the invention should not be limited to those embodiments. Many modifications may be made without departing from the scope of the appended claims.

What is claimed is:

1. A display device comprising:
   as active matrix circuit comprising thin-film transistors (TFTs) as switching devices and formed over an insulating substrate;
   a signal line driver circuit and a scanning line driver circuit for driving said active matrix circuit, said signal line driver circuit and said scanning line driver circuit being formed over said insulating substrate; and
   at least one differential amplifier formed over said insulating substrate and comprising TFTs, said differential amplifier having a pair of input terminals for a non-inverted input signal an inverted signal of said non-inverted input signal to amplify said non-inverted and inverted input signals, wherein the signal amplified by said differential amplifier is sent to said signal line driver circuit or to said scanning line driver circuit.

2. A device according to claim 1, wherein said input signals have amplitudes less than 5 V.

3. A device according to claim 1, wherein said differential amplifier comprises a differential circuit comprising TFTs whose sources are connected together, and wherein a constant-current source is connected with said differential circuit.

4. A device according to claim 1, wherein
   (A) said differential amplifier is an analog amplifier comprising a differential circuit which comprises TFTs whose sources are connected together;
   (B) a constant-current source is connected with said differential circuit; and
   (C) a source-grounded differential amplifier amplifies an output signal from said differential amplifier.

5. A device according to claim 1, wherein said differential amplifier comprises low-temperature polysilicon TFTs fabricated by a low-temperature process having a maximum process temperature of 650° C. or less.

6. A device according to claim 1, wherein said device is an active matrix liquid crystal device.

7. A display device according to claim 1 wherein said non-inverted input signals are at least one of a control signal, a clock signal and a start pulse signal and said inverted input signals are inverted signals of said non-inverted input signals.

8. A display device according to claim 1 wherein said display device is a liquid crystal display device.

9. A display device comprising:
   an active matrix circuit comprising a plurality of first thin film transistors formed over a substrate;
   a signal line driver circuit and a scanning line driver circuit for driving said active matrix circuit, both of said signal line driver circuit and said scanning line driver circuit comprising second polysilicon thin film transistors formed over said substrate;
   a single crystal semiconductor integrated circuit for generating signals for driving said signal line driver circuit and said scanning line driver circuit; and
   an analog amplifying circuit for amplifying the signals from said integrated circuit and supplying the amplified signals to at least one of the signal line driver circuit and the scanning line driver circuit, wherein said signals are at least one of control signals, clock signals, and start pulse signals,
   wherein said amplifying circuit comprises third polysilicon thin film transistors formed over said substrate.

10. A device according to claim 9 wherein said second and third polysilicon thin film transistors have substantially a same structure.

11. A device according to claim 9 wherein said analog amplifying circuit comprises a differential amplifier.

12. A device according to claim 7 wherein the signals from said integrated circuit and inverted signals of said signals are input to said analog amplifying circuit.

13. A display device according to claim 12 wherein said signals are at least a control signal.

14. A display device according to claim 12 wherein said signals are at least a clock signal.

15. A display device according to claim 12 wherein said signals are at least a start pulse signal.

16. A display device according to claim 9 wherein said display device is a liquid crystal display device.

17. A display device comprising:
   an active matrix circuit comprising a plurality of first thin film transistors formed over a substrate;
   a signal line driver circuit and a scanning line driver circuit for driving said active matrix circuit, both of said signal line driver circuit and said scanning line driver circuit comprising second thin film transistors formed over said substrate;
   at least one differential amplifier operationally connected to one of said signal line driver circuit and said scanning line driver circuit, said amplifier comprising at least one differential circuit and at least one current mirror circuit,
   wherein each of said differential circuit and said current mirror circuit comprises third thin film transistors formed over said substrate,
   wherein said differential amplifier has a pair of input terminals for an input signal and an inverted signal of said input signal, and said input signals are amplified by said differential amplifier, and the amplified signal is sent to one of said signal line driver circuit and said scanning line driver circuit.

18. A device according to claim 17 wherein each of said first, second and third thin film transistors has a polycrystal channel.

19. A display device according to claim 17 wherein at least a clock signal and an inverted signal of said clock signal are input to said differential amplifier.

20. A display device according to claim 17 wherein at least a control signal and an inverted signal of said control signal are input to said differential amplifier.

21. A display device according to claim 17 wherein at least a start pulse signal and an inverted signal of said start pulse signal are input to said differential amplifier.

22. A display device according to claim 17 wherein said display device is a liquid crystal display device.

* * * * *